(12) United States Patent
Felland

(10) Patent No.: US 10,066,755 B1
(45) Date of Patent: Sep. 4, 2018

(54) TAMPER RESISTANT DEVICE FOR AN APPLIANCE

(71) Applicant: Andrew Felland, Blaine, MN (US)

(72) Inventor: Andrew Felland, Blaine, MN (US)

( * ) Notice: Subject to any disclaimer, the term of this patent is extended or adjusted under 35 U.S.C. 154(b) by 0 days.

(21) Appl. No.: 15/670,214

(22) Filed: Aug. 7, 2017

(51) Int. Cl.
| | |
|---|---|
| *F16K 27/12* | (2006.01) |
| *F16K 35/00* | (2006.01) |
| *F24D 19/00* | (2006.01) |
| *F24D 19/10* | (2006.01) |
| *B60R 25/09* | (2013.01) |
| *B60B 7/16* | (2006.01) |
| *E05B 73/00* | (2006.01) |
| *F24H 9/20* | (2006.01) |

(52) U.S. Cl.
CPC ............. *F16K 27/12* (2013.01); *B60B 7/16* (2013.01); *B60R 25/093* (2013.01); *E05B 73/00* (2013.01); *F16K 35/00* (2013.01); *F24D 19/0097* (2013.01); *F24D 19/1051* (2013.01); *F24H 9/2007* (2013.01)

(58) Field of Classification Search
CPC .......... B60B 7/16; B60R 25/093; E05B 73/00; F16K 27/12; F16K 35/00; F24D 19/0097; F24D 19/1051; F24H 9/2007
USPC ..... 70/14, 18, 54–56, 58, 163, 164, 166, 167
See application file for complete search history.

(56) References Cited

U.S. PATENT DOCUMENTS

| | | | | |
|---|---|---|---|---|
| 4,418,551 A | * | 12/1983 | Kochackis | ............... E05B 73/00 292/259 R |
| 6,920,771 B1 | * | 7/2005 | Griffith | .................... B60R 25/09 188/32 |
| 7,975,515 B2 | * | 7/2011 | Ygnelzi | ............... E05L 313/001 109/52 |
| 8,783,074 B2 | * | 7/2014 | Madruga | ............. E05B 65/0089 70/164 |

* cited by examiner

*Primary Examiner* — Suzanne Lale Dino Barrett
(74) *Attorney, Agent, or Firm* — Dave Alan Lingbeck

(57) ABSTRACT

A tamper resistant device for an appliance for preventing unauthorized access to and manipulation of the controls for a water heater or the like. The tamper resistant device for an appliance includes a support assembly adapted to secure about a back of a control unit of an appliance and a cover member removably securable to the support assembly and adapted to cover the control unit of the appliance.

8 Claims, 4 Drawing Sheets

TAMPER RESISTANT DEVICE FOR AN APPLIANCE

BACKGROUND OF THE INVENTION

Field of the Invention

The present invention relates to locked covers and more particularly pertains to a new tamper resistant device for an appliance for preventing unauthorized access to and manipulation of the controls for a water heater or the like.

Description of the Prior Art

The use of locked covers is known in the prior art. More specifically, locked covers heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a flexible generally rectangular body having a top retainer including a step for engaging the lip of a lug on the top surface of the control device with a pair of laterally interfering surfaces are provided for longitudinally aligning the shield with respect to the underlining control device. Another prior art includes a floor structure for mounting the safety shield thereon and a mounting strip mounted on the floor structure in generally fluid-tight connection therewith. Also, another prior art includes a tank including an outer surface, and including an inner surface defining a water chamber, an electrical component extending outwardly of the outer surface of the tank, an outer jacket surrounding the tank and having therein an opening affording access to the electrical component, a door which is mounted on the outer jacket and which covers the opening, a dam which is located within the opening and surrounds the electrical component, which extends between the tank and the outer jacket, and which includes a portion extending between the door and the outer jacket, and insulating material located between the tank and the outer jacket and outside of the dam. Further another prior art includes a protective shield for covering the terminal and preventing foam contact with the terminal. The shield includes a face portion covering the thermostat in spaced relation to the tank. While these devices fulfill their respective, particular objectives and requirements, the aforementioned patents do not disclose a new tamper resistant device for a water heater.

SUMMARY OF THE INVENTION

The general purpose of the present invention, which will be described subsequently in greater detail, is to provide a new tamper resistant device for an appliance which has many of the advantages of the locked covers mentioned heretofore and many novel features that result in a new tamper resistant device for an appliance which is not anticipated, rendered obvious, suggested, or even implied by any of the prior art locked covers, either alone or in any combination thereof. The present invention includes a support assembly adapted to secure about a back of a control unit of an appliance and a cover member removably securable to the support assembly and adapted to cover the control unit of the appliance. None of the prior art includes the combination of the elements of the present invention.

There has thus been outlined, rather broadly, the more important features of the tamper resistant device for an appliance in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new tamper resistant device for an appliance which has many of the advantages of the locked covers mentioned heretofore and many novel features that result in a new tamper resistant device for an appliance which is not anticipated, rendered obvious, suggested, or even implied by any of the prior art locked covers, either alone or in any combination thereof.

Still another object of the present invention is to provide a new tamper resistant device for an appliance for preventing unauthorized access to and manipulation of the controls for a water heater or the like.

Still yet another object of the present invention is to provide a new tamper resistant device for an appliance that easily and conveniently clips on about the control unit for an appliance such as the water heater.

Even still another object of the present invention is to provide a new tamper resistant device for an appliance that prevents kids from having access to the control module.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
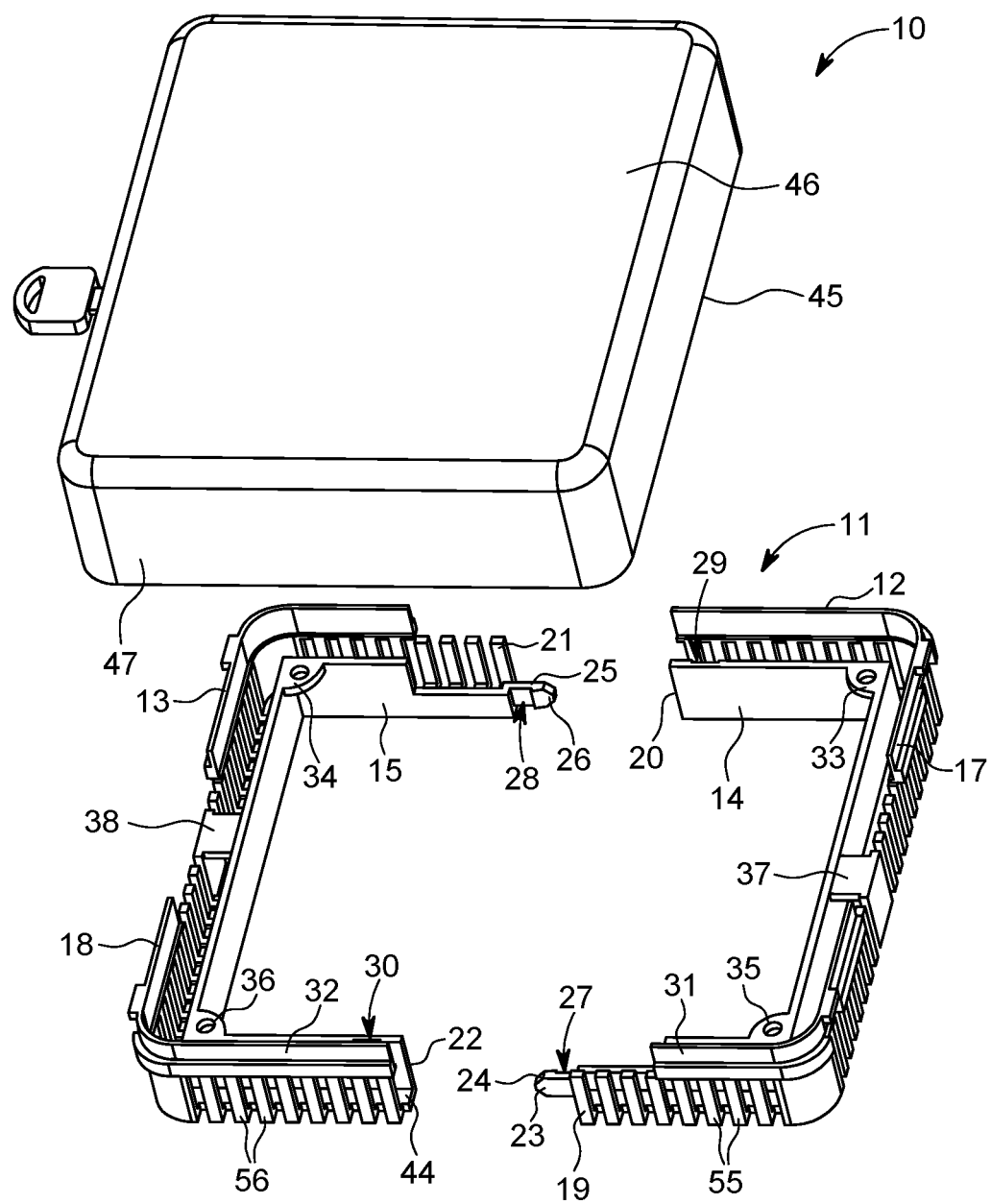
FIG. 1 is an exploded perspective view of a new tamper resistant device for an appliance according to the present invention.
Figure 2:
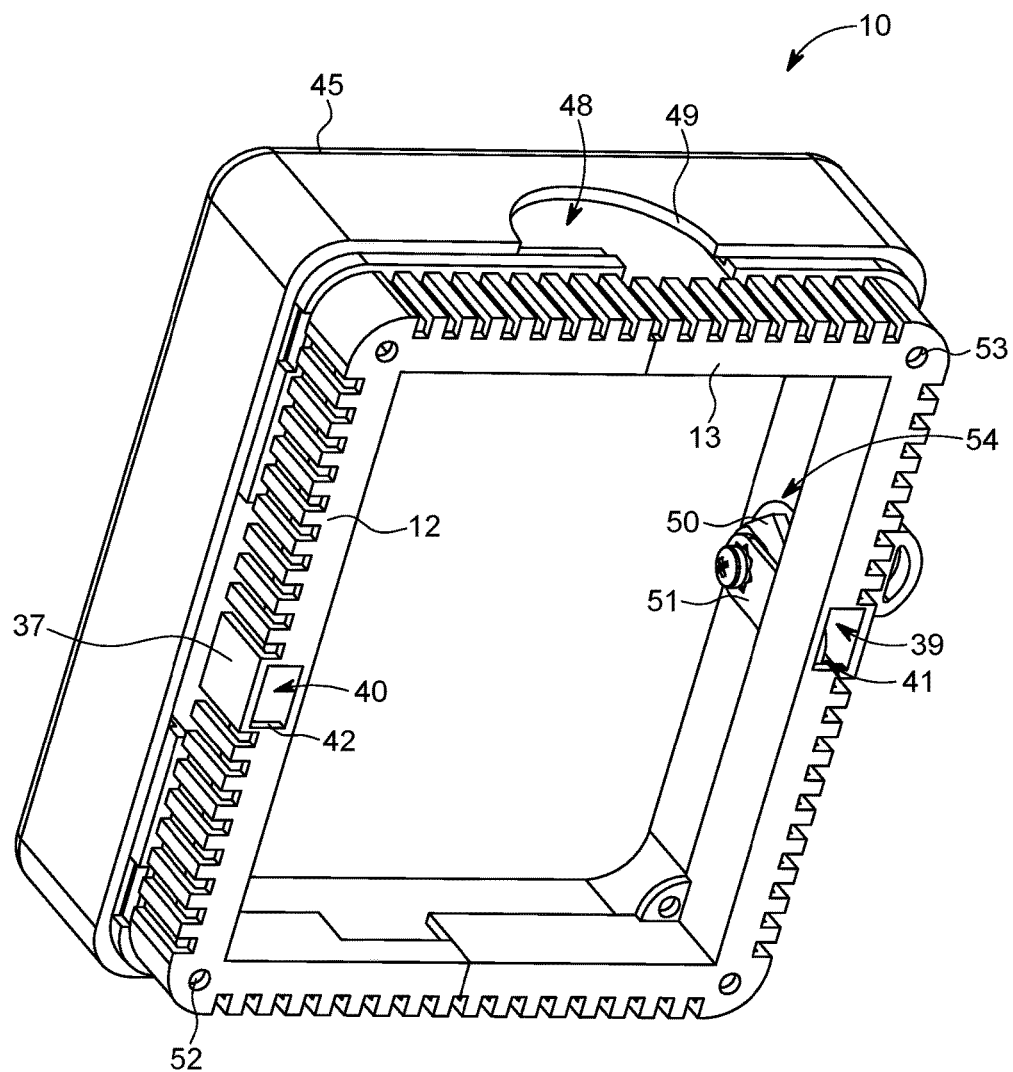
FIG. 2 is a rear perspective view of the present invention.
Figure 3:
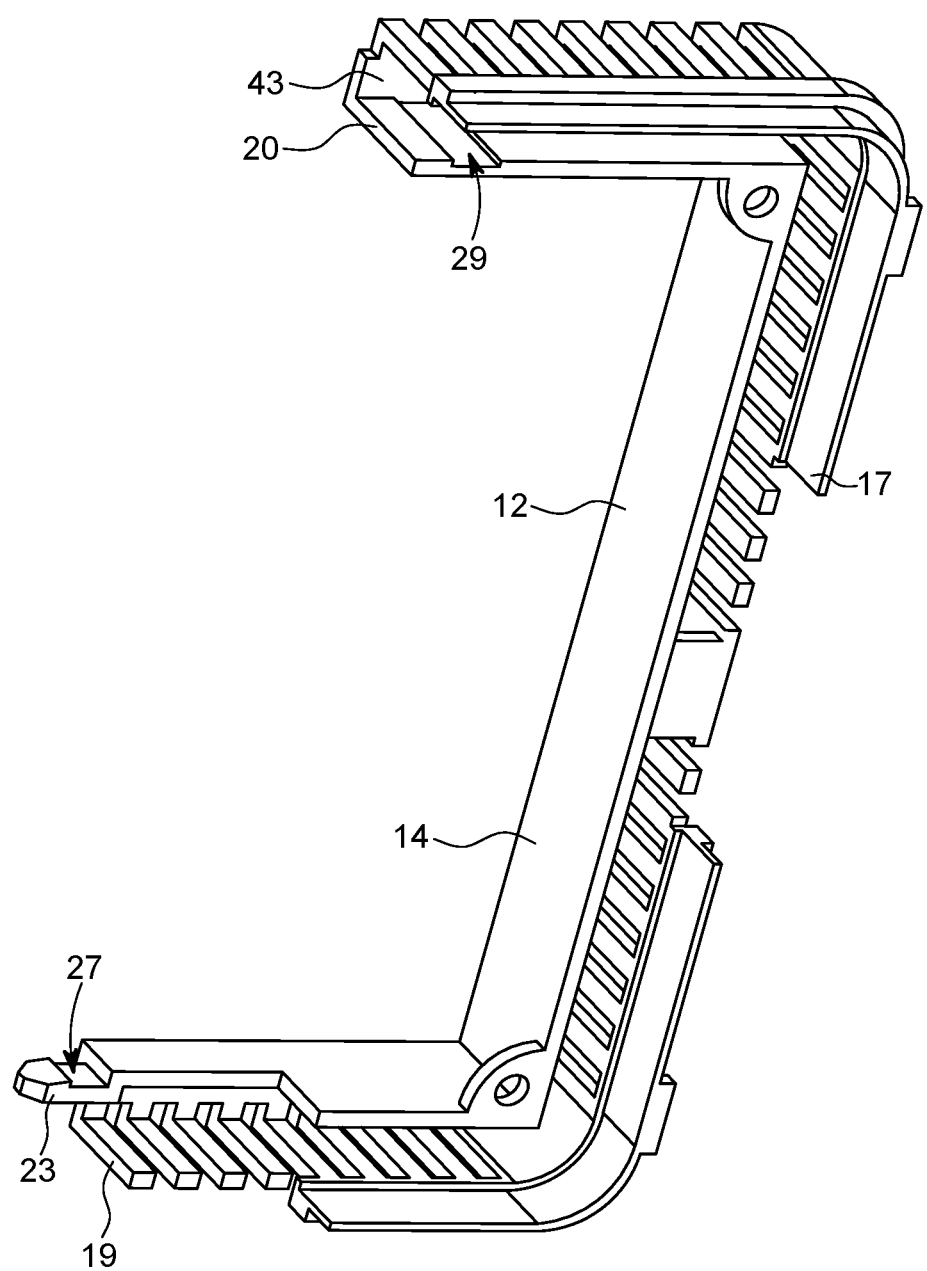
FIG. 3 is a rear perspective view of the first frame section of the present invention.
Figure 4:
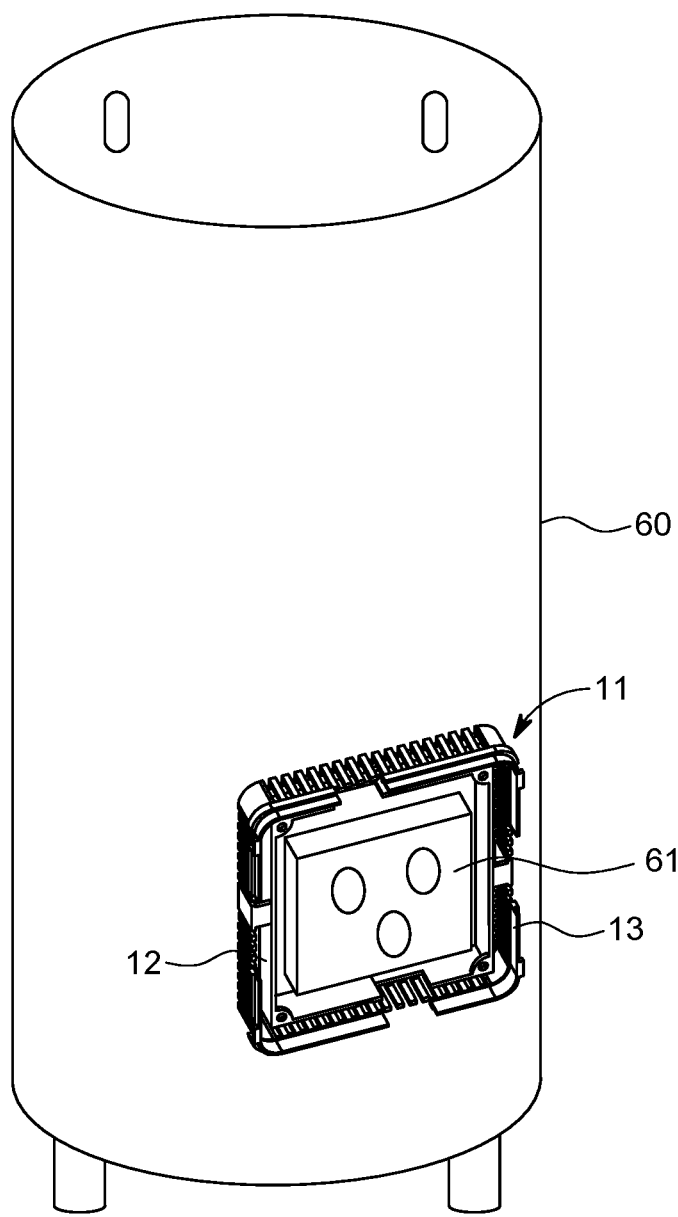
FIG. 4 is a front perspective view of the present invention in use with an appliance.

With reference now to the drawings, and in particular to FIGS. 1 through 4 thereof, a new tamper resistant device for an appliance embodying the principles and concepts of the present invention and generally designated by the reference numeral 10 will be described.

As best illustrated in FIGS. 1 through 4, the tamper resistant device for an appliance 10 generally comprises a support assembly 11 adapted to secure about a back of a control unit 61 of an appliance 60 and a cover member 45 removably securable to the support assembly 11 and adapted to cover the control unit 61 of the appliance 60.

The support assembly 11 includes an open-ended first frame section 12 and an open-ended second frame section 13 removably coupled to the first frame section 12 to enclose about the back of the control unit 61 of the appliance 60. The first frame section 12 include a first inner wall 14 having a narrow width and a first outer wall 17 having a narrow width and spaced from the first inner wall 14. The second frame section 13 includes a second inner wall 15 having a narrow width and a second outer wall 18 having a narrow width and spaced from second inner wall 15. Each of the first and second inner walls 14, 15 has opposed first and second ends 19-22. Each of the first ends 19, 21 has a rigid tab 23, 25 integrally attached to and extending outwardly from the respective first end 19, 21. Each of the rigid tabs 23, 25 extends along a longitudinal axis of the respective inner wall 14, 15. Each of the first and second inner walls 14, 15 also has a laterally-extending groove 29, 30 disposed in an outer side of the respective inner wall 14, 15 proximate to the respective second end 20, 22. Each of the rigid tabs 23, 25 has an outer tip 24, 26 and an inner side facing inwardly of a respective first and second frame sections 12, 13 and has a laterally-extending slot 27, 28 disposed in the inner side and spaced from the outer tip 24, 26 of the respective rigid tab 23, 25. The rigid tab 23 of the first frame section 12 is removably coupled in the laterally-extending groove 30 proximate to the second end 22 of the second frame section 13, and the rigid tab 25 of the second frame section 13 is removably coupled in the laterally-extending groove 29 proximate to the second end 20 of the first frame section 12 to secure the first and second frame sections 12, 13 to one another about the back of the control unit 61 of the appliance 60. The support assembly 11 further includes intermediate walls 43, 44 integrally interconnecting the inner and outer walls 14, 15, 17, 18 of the first and second frame sections 12, 13. The first frame section 12 has a first block 38 integrally interconnecting the first inner and outer walls 14, 15 with the first block 38 having a bore 39 extending therethrough and a slot 41 disposed in a wall forming the bore 39. The second frame section 13 has a second block 37 integrally interconnecting the second inner and outer walls 17, 18 with the second block 37 having a bore 40 extending therethrough and a slot 42 disposed in a wall forming the bore 40.

The cover member 45 includes a main wall 46, an endless side wall 47 integral to the main wall 46, a cavity 48, a key hole 52 disposed through the side wall 47, a handhold slot 49 disposed in the side wall 47 and a latch support member 50 pivotably and conventionally disposed in the key hole 54 and a latch 51 conventionally connected to the latch support member 50 and removably received in the slot 41 of the first bore 39 of the first block 38 to lockingly secure the cover member 45 to the support assembly 11.

Each of the first and second inner walls 14, 15 has ledges 33, 34 spaced apart and integrally extending inwardly of each of the first and second frame sections 12, 13 with the ledges 33, 34 having holes 35, 36 disposed therethrough. The cover member 45 includes connectors 52, 53 integrally extending from the side wall 47 and removably received in the holes 35, 36 in the ledges 33, 34 of the first and second frame sections 12, 13 to connect the cover member 45 to the support assembly 11. Each of the first and second outer walls 17, 18 has slats 55, 56 spaced apart and laterally disposed side to side along and forming portions of the respective outer wall 17, 18 and integrally attached to the respective intermediate wall 43, 44 through which air is vented when the cover member 45 is removably secured to the support assembly 11.

In use, the user positions the first and second frame sections 12, 13 behind the control unit 61 of the appliance 60 and uses the rigid tabs 23, 5 to interlock the first and second frame sections 12, 13 together. The user then places the cover member 45 over the control unit 61 and inserts the connectors 52, 53 into the holes 35, 36 of the support assembly 11 and locks the cover member 45 to the support assembly 11 with the latch 51 inserted into the bore 39, 40 and the slot 41, 42 of one of the blocks 37, 38 to prevent tampering of the control unit 61.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in, the art, and all equivalent relationships to those illustrated in the drawings and described in the specification are intended to be encompassed by the present invention.

Therefore, the foregoing is considered as illustrative only of the principles of the tamper resistant device for an appliance. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tamper resistant device for an appliance as comprising:
 a support assembly adapted to secure about a back of a control unit of an appliance, wherein the support assembly includes an open-ended first frame section and an open-ended second frame section removably coupled to the first frame section to enclose about the back of the control unit of the appliance, wherein the first frame section includes a narrow first inner wall and a narrow first outer wall spaced from the first inner wall, wherein the second frame section includes a narrow second inner wall and a narrow second outer wall spaced from the second inner wall, wherein each of the first and second inner walls has opposed first and second ends, wherein each of the first ends has a rigid tab extending outwardly therefrom, wherein each of the first and second inner walls also has a laterally-extending groove disposed in an outer side of the respective said first and second inner walls proximate to a respective said second end; and
 a cover member removably securable to the support assembly and adapted to cover the control unit of the appliance.

2. The tamper resistant device for an appliance as described in claim 1, wherein each of the rigid tabs has an outer tip and an inner side facing inwardly of a respective said first and second frame sections and has a laterally-extending slot disposed in the inner side and spaced from the outer tip of the respective said rigid tab.

3. The tamper resistant device for an appliance as described in claim 2, wherein the rigid tab of the first frame section is removably coupled in the laterally-extending groove proximate to the second end of the second frame section, and the rigid tab of the second frame section is removably coupled in the laterally-extending groove proximate to the second end of the first frame section to secure the first and second frame sections to one another about the back of the control unit of the appliance.

4. A tamper resistant device for an appliance as comprising:
   a support assembly adapted to secure about a back of a control unit of an appliance, wherein the support assembly includes an open-ended first frame section and an open-ended second frame section removably coupled to the first frame section to enclose about the back of the control unit of the appliance, wherein the first frame section includes a narrow first inner wall and a narrow first outer wall spaced from the first inner wall, wherein the second frame section includes a narrow second inner wall and a narrow second outer wall spaced from the second inner wall, wherein the first frame section has a first block interconnecting the first inner and first outer walls and the second frame section has a second block interconnecting the second inner and second outer walls, wherein the first block has a bore extending therethrough and a slot disposed in a wall forming the bore; and
   a cover member removably securable to the support assembly and adapted to cover the control unit of the appliance.

5. The tamper resistant device for an appliance as described in claim 4, wherein the cover member includes a main wall, an endless side wall integral to the main wall, a cavity, a key hole disposed through the side wall, a handhold slot disposed in the side wall and a latch support member pivotably disposed in the key hole and a latch connected to the latch support member and removably received in the slot in the bore of the first block to lockingly secure the cover member to the support assembly.

6. The tamper resistant device for an appliance as described in claim 5, wherein each of the inner walls of the first and second frame sections has ledges spaced apart and extending inwardly of each of the first and second frame sections with the ledges having holes disposed therethrough.

7. The tamper resistant device for an appliance as described in claim 6, wherein the cover member includes connectors extending from the side wall and removably received in the holes in the ledges of the first and second frame sections to connect the cover member to the support assembly.

8. The tamper resistant device for an appliance as described in claim 4, wherein each of the first and second outer walls has slats spaced apart and laterally disposed side to side along and forming portions of the respective first and second outer walls through which air is vented when the cover member is removably secured to the support assembly.

* * * * *